Dec. 1, 1931.  F. WANDER, JR  1,834,558
AUTOHELIROTOR
Filed May 11, 1931
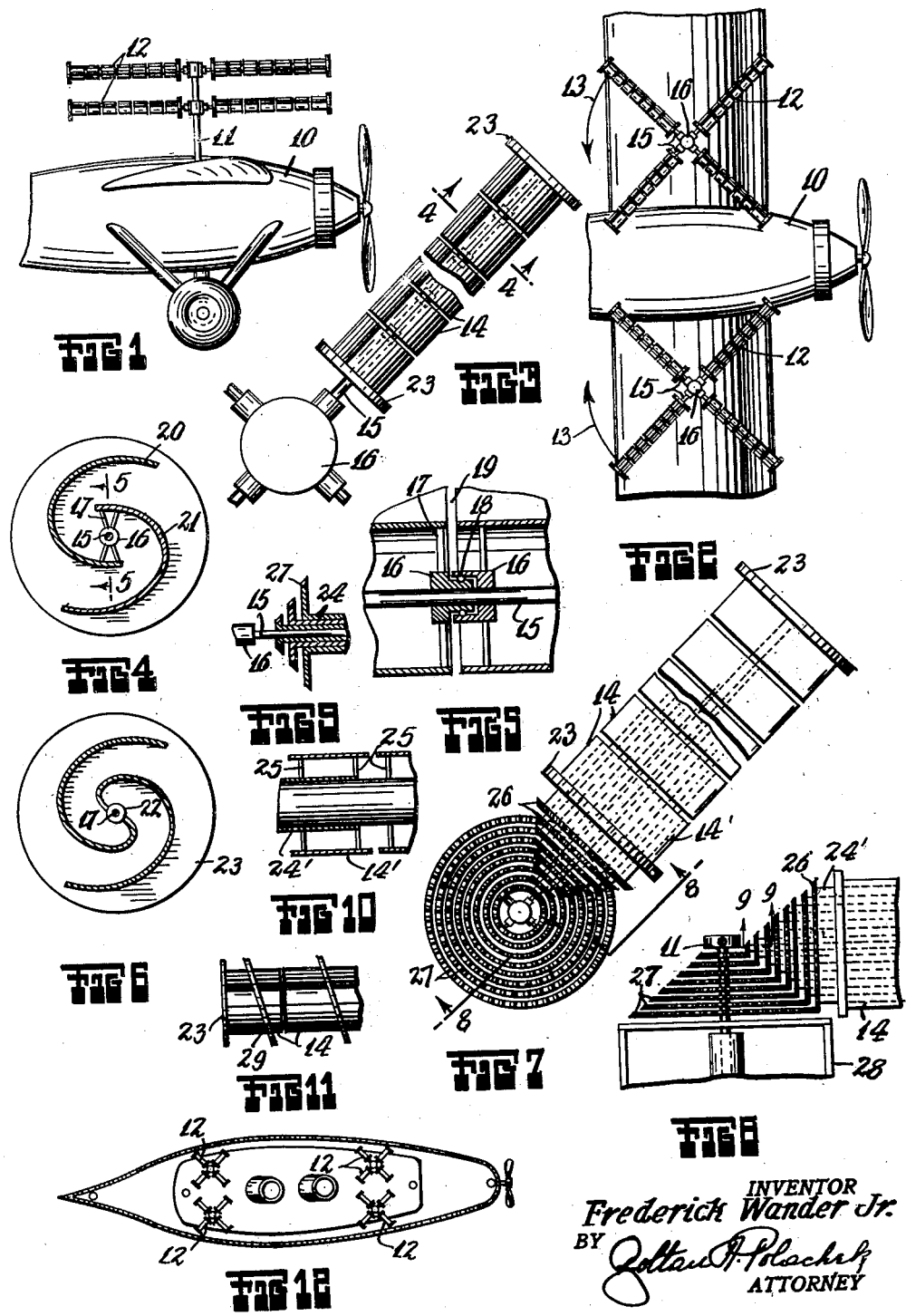
INVENTOR
Frederick Wander Jr.
BY
ATTORNEY Patented Dec. 1, 1931

1,834,558

UNITED STATES PATENT OFFICE

FREDERICK WANDER, JR., OF NEW YORK, N. Y.

AUTOHELIROTOR

Application filed May 11, 1931. Serial No. 536,336.

This invention relates to new and useful improvements in a helicopter for airships, ships and the like.

The invention has for an object the construction of a helicopter which is characterized by a rotor for rotating on a vertical axis and having blades capable of rotating on a horizontal axis and each of the blades comprising a plurality of blade sections independent from each other so as to be capable of rotating on the axis individually, whereby the outer blade section may rotate at the larger speed and the speeds of rotation of the other blade sections progressively decrease until the innermost blade section rotates at the slowest speed.

As a helicopter rotates, the outer ends of the blades travel through a greater distance than the inner ends and the intermediate points progressively taper down in speed from the greatest to the smallest. It is customary to make each of the blades from one piece with the consequence that the blade is forced to rotate at one speed. This produces strains within the blade itself besides causing a commotion of the air and materially reducing the efficiency.

The ideal construction of a helicopter blade would be to construct it of a plurality of adjacent parallel sections of very narrow width, just the width of a point, whereby each of these sections can rotate at different speeds according to the travel of the particular points on the blade, but such construction is impractical and it is therefore proposed to divide the helicopter blade into fifteen sections. It is calculated that one example to show the operation of the device would be when the outer section of the blade rotates at 500 R. P. M., the inner section will rotate at 350 R. P. M.

It is another object of this invention to arrange helicopters according to this construction superimposed one above the other so that they have a common vertical axis.

A still further object of this invention is the construction of a helicopter airship with a pair of helicopters arranged in the same plane adjacent each other.

A still further object of this invention is to arrange each of the blade sections of the helicopter so that their cross sections are of substantially S form with the central portion of the S cut out.

Another object of this invention is to arrange the cross sections of the helicopter blade sections of substantially S form.

The invention has for a still further object the provision of means to drive the individual blade sections at graduated speeds with the outer section being driven the fastest, the inner sections the slowest, and the intermediate sections progressively from the fastest to the slowest.

As another object of this invention it is proposed to arrange a radial shaft for each of the helicopter blades, to place superimposed tools on said shaft arranged to connect with the various blade sections, and with gears acting against stationary racks so as to produce the graduation of speeds before referred to.

Another one of the objects of this invention is the construction of deflectors upon the helicopter blade sections.

A still further object of this invention is the construction of a helicopter for airships, ships and the like, which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a fragmentary side elevational view of an airship provided with helicopters according to this invention.

Fig. 2 is a plan view of another airship provided with helicopters according to another embodiment of the invention.

Fig. 3 is a fragmentary plan view of one of the helicopters showing in particular the details of one of the blades.

Fig. 4 is a transverse sectional view taken on the line 4—4 of Fig. 3.

Fig. 5 is a longitudinal enlarged sectional view taken on the line 5—5 of Fig. 4.

Fig. 6 is a view similar to Fig. 4, but illustrating another modification.

Fig. 7 is a view similar to Fig. 3, but illustrating a still further modified form of the invention.

Fig. 8 is a fragmentary elevational view looking in the direction of the line 8—8 of Fig. 7.

Fig. 9 is a fragmentary sectional view taken on the line 9—9 of Fig. 8.

Fig. 10 is a fragmentary sectional view of a portion of Fig. 8 showing in particular the construction of the mountings of the blade sections upon the telescoping tubular members.

Fig. 11 is a fragmentary elevational view of a helicopter blade constructed according to a still further embodiment of the invention.

Fig. 12 is a plan view of a boat showing the invention applied thereto.

In Fig. 1 an aeroplane 10 has been illustrated which is provided with a vertical shaft 11 supporting a pair of helicopters 12 superimposed upon each other. Fig. 2 shows the aeroplane 10 equipped with a pair of helicopters 12 arranged in the same plane and adjacent or to the sides of each other. Reference numeral 13 indicates the direction of rotation of the helicopters in Fig. 2 to show that they must turn towards each other.

In Fig. 3 a detail of one of the helicopters shown in Figs. 1 or 2 has been illustrated. While the helicopter is shown with four blades, it should be borne in mind that this is not intended as a limitation since it could be constructed equally well with two. Each of the helicopter blades are formed from a plurality of blade sections 14. These blade sections are separate from each other so that they may rotate individually. A radial shaft 15 projects from the hub 16 of the vertical shaft 11. Each of the blade sections 14 are rotatively supported upon the radial shaft 15. The construction is accomplished by bushings 16 rotative upon the shaft 15 and having arms 17 which connect with the blade sections. Roller bearings 18 are arranged between adjacent bushings 16 so as to form thrust joints. Thus the edges of each of the blade sections may be spaced slightly from each other to produce an opening 19. This opening should be very small, in fact just enough clearance to allow each of the blade sections to rotate individually. In Fig. 4 the blade section is shown of substantially S shape except that the central portion is missing forming an opening. More specifically, the blade comprises a substantially semi-ring section 20 and a second semi-ring section 21. The shaft 15 is illustrated with a bushing 16 thereon from which the arms 17 project to properly support the blade sections.

In Fig. 6 another modified arrangement of the helicopter blade has been disclosed, in which the transverse cross section of the blade is substantially of S shape. In this form the shaft 15 which supports each of the blade sections work through tubular bearings 22 connected upon the central portion of the S shape. At each end of the complete helicopter blade there are flanges 23.

In Figs. 7 to 10 inclusive a modified arrangement of the invention has been disclosed, in which a means is provided for positively driving each of the blade sections 14 at their proper speeds. This means is in the form of a plurality of superimposed tubular members 24. These tubular members are of different lengths and arranged so that the largest one, indicated by reference numeral 24' in Figs. 8 and 10, supports the innermost of the blade sections which is indicated by reference numeral 14'. The supporting is accomplished by radial arms 25. A large gear 26 is formed on the inner end of the tube and meshes with a large stationary rack 27. The next two within the tube 24' extends from the outermost tube and carries a slightly smaller gear which meshes with a slightly smaller circular rack. The second tube connects with the second blade section. In this manner all of the tubes correspondingly carry a gear which meshes with a circular rack and carries one of the blade sections. A stand 28 serves as a support for all of the stationary racks.

As the vertical shaft 11 rotates, the helicopter will be turned on its vertical axis. Each of the sections forming the blades will also turn at various speeds progressively from the slow speed at the inner sections to the higher speed at the outer sections. This is so in that each of the blade sections are connected up with the gears that work against the circular racks, and the circular racks and gears are designed so as to produce the arrangement of speeds mentioned. It should be noticed that as the smallest gear runs around upon the circular rack, the largest number of rotations will be had. The smallest gear is connected with the outermost of the blade sections and consequently the outermost section turns with the greater speed. In this manner the gears gradually increase in size so as to produce the desired speeds. While the racks are of different size as may be seen in Figs. 7 and 8, still the ratio between the gear sizes and the rack sizes are such that these sections of the blade will be driven at the speeds which they are designed for.

In Fig. 11 another modification of the invention has been disclosed, in which each of the blade sections 14 are provided with inclined deflecting plates 29. These plates extend completely around the blades in the manner as a ring extends around one's finger, except that they are set at inclinations as clearly shown in Fig. 11.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A helicopter for airships, ships and the like, comprising a rotor for rotation on a vertical axis and comprising blades mounted for rotating on a horizontal axis, and each of the blades comprising a plurality of blade sections independent from each other, whereby the outer blade section may turn at the greatest speed and progressively the other sections turn at different speeds with the inner section turning at the slowest speed.

2. A helicopter for airships, ships and the like, comprising a rotor for rotation on a vertical axis and comprising blades mounted for rotating on a horizontal axis, and each of the blades comprising a plurality of blade sections independent from each other, whereby the outer blade section may turn at the greatest speed and progressively the other sections turn at different speeds with the inner section turning at the slowest speed, the outer ends of the innermost and the outermost blade sections being provided with a flange.

3. A helicopter for airships, ships and the like, comprising a rotor for rotation on a vertical axis and comprising blades mounted for rotating on a horizontal axis, and each of the blades comprising a plurality of blade sections independent from each other, whereby the outer blade section may turn at the greatest speed and progressively the other sections turn at different speeds with the inner section turning at the slowest speed, each of the blade sections being of substantially S shape in transverse cross section but with portions of the center missing.

4. A helicopter for airships, ships and the like, comprising a rotor for rotation on a vertical axis and comprising blades mounted for rotating on a horizontal axis, and each of the blades comprising a plurality of blade sections independent from each other, whereby the outer blade section may turn at the greatest speed and progressively the other sections turn at different speeds with the inner section turning at the slowest speed, each of the blade sections being of substantially S shape.

5. A helicopter for airships, ships and the like, comprising a rotor for rotation on a vertical axis and comprising blades mounted for rotating on a horizontal axis, and each of the blades comprising a plurality of blade sections independent from each other, whereby the outer blade section may turn at the greatest speed and progressively the other sections turn at different speeds with the inner section turning at the slowest speed, each of the blade sections being rotative upon a radial shaft, and bearings being provided so as to hold the sections upon and contacting with each other.

6. In combination with an airship, ship or the like, a pair of helicopters superimposed upon each other so as to have a common vertical axis and each of the helicopters having blades rotative on horizontal axis, each of the blades being formed from a plurality of adjacent blade sections independent from each other, whereby the blade sections may rotate at different speeds with the outer section turning at the greater speed and progressively to the inner section turning at the lowest speed.

7. In combination with an airship, ship or the like, a pair of helicopters in the same plane and spaced from each other and each of the helicopters having blades rotative on horizontal axis, each of the blades being formed from a plurality of adjacent blade sections independent from each other, whereby the blade sections may rotate at different speeds with the outer section turning at the greater speed and progressively to the inner section turning at the lowest speed.

8. A helicopter for airships, ships and the like, comprising a rotor for rotation on a vertical axis and comprising blades mounted for rotating on a horizontal axis, each of the blades comprising a plurality of blade sections independent from each other, whereby the outer blade section may turn at the greatest speed and progressively the other sections turn at different speeds with the inner section turning at the slowest speed, and means for driving the blade sections at the speeds mentioned.

9. A helicopter for airships, ships and the like, comprising a rotor for rotation on a vertical axis and comprising blades mounted for rotating on a horizontal axis, each of the blades comprising a plurality of blade sections independent from each other, whereby the outer blade section may turn at the greatest speed and progressively the other sections turn at different speeds with the inner section turning at the slowest speed, and means for driving the blade sections at the speeds mentioned, comprising superimposed tubes, said blade sections being individually connected with the tubes in a progressive manner, gears of different sizes on the free ends of said tubes, and stationary racks meshing with said gears.

10. A helicopter for airships, ships and the like, comprising a rotor for rotation on a vertical axis and comprising blades mounted for rotating on a horizontal axis, each of the blades comprising a plurality of blade sections independent from each other, whereby the outer blade section may turn at the greatest speed and progressively the other sections turn at different speeds with the inner section turning at the slowest speed, and means for driving the blade sections at the speeds mentioned, comprising superimposed tubes, said blade sections being individually connected with the tubes in a progressive manner, gears of different sizes on the free ends of said tubes, and stationary racks meshing with said gears, said stationary racks being circular to allow rotation of the helicopter.

11. A helicopter for airships, ships and the like, comprising a rotor for rotation on a vertical axis and comprising blades mounted for rotating on a horizontal axis, each of the blades comprising a plurality of blade sections independent from each other, whereby the outer blade section may turn at the greatest speed and progressively the other sections turn at different speeds with the inner section turning at the slowest speed, and deflector plates on each of the sections.

12. A helicopter for airships, ships and the like, comprising a rotor for rotation on a vertical axis and comprising blades mounted for rotating on a horizontal axis, each of the blades comprising a plurality of blade sections independent from each other, whereby the outer blade section may turn at the greatest speed and progressively the other sections turn at different speeds with the inner section turning at the slowest speed, and deflector plates on each of the sections, each of said deflector plates being of ring shape and inclined.

In testimony whereof I have affixed my signature.

FREDERICK WANDER, Jr.